Aug. 7, 1928.

G. L. ZUCKER 1,680,192

WEIGHING MECHANISM

Filed July 28, 1922   2 Sheets-Sheet 1

INVENTOR.
George L. Zucker
BY
his ATTORNEY

Aug. 7, 1928.
G. L. ZUCKER
1,680,192
WEIGHING MECHANISM
Filed July 28, 1922
2 Sheets-Sheet 2
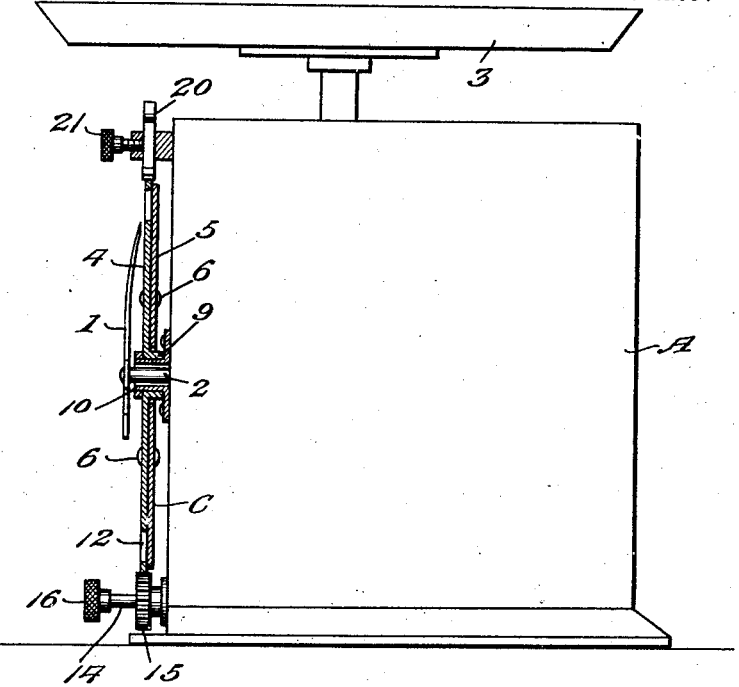
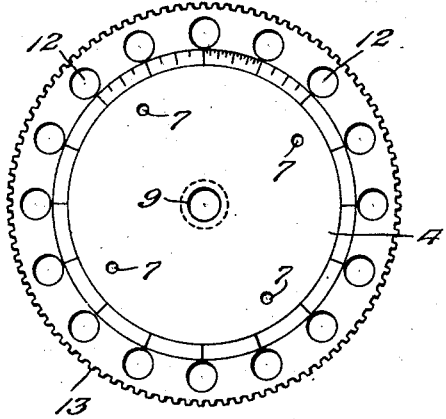 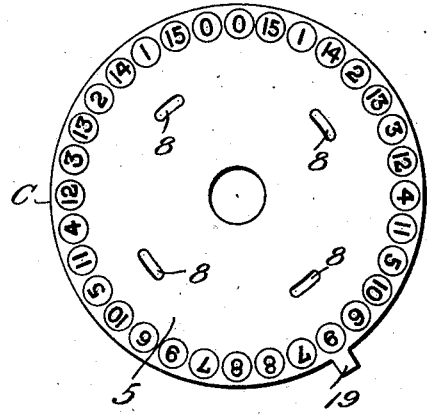
INVENTOR.
George L. Zucker
BY
Vernon E. Hodge
his ATTORNEY Patented Aug. 7, 1928.

1,680,192

UNITED STATES PATENT OFFICE.

GEORGE L. ZUCKER, OF EAST ORANGE, NEW JERSEY.

WEIGHING MECHANISM.

Application filed July 28, 1922. Serial No. 578,237.

My invention relates to an improvement in weighing mechanism.

The object is to provide simple means for regular weighing on or weighing off as the case may be, and incidently to provide a simple method for eliminating the tare of any container in which the actual goods to be weighed are held.

This invention includes any suitable scale mechanism in connection with the usual hand or pointer movable by the weight on the scale, and a resettable dial composed of two disks adjustably connected together, one having two sets of figures thereon, one set arranged clock-wise and the other counter clock-wise and the other disk having openings through which one set of the figures on the other disk is discernible from the face of the dial accordingly as the disks composing the dial are adjusted, this adjustment of the dial being provided for weighing in an ordinary manner by adding material to the scale pan or platform or by reversing the operation, that is to say by removing portions of the weighed material or articles.

In the accompanying drawings:

Figure 1 is a view in side elevation showing one adjustment of the dial for the ordinary operation of weighing on;

Fig. 3 is a side view, the dial and certain associate parts in vertical section; and Figs. 4 and 5 are views of the outside and inside disks respectively composing the dial.

Figure 1:
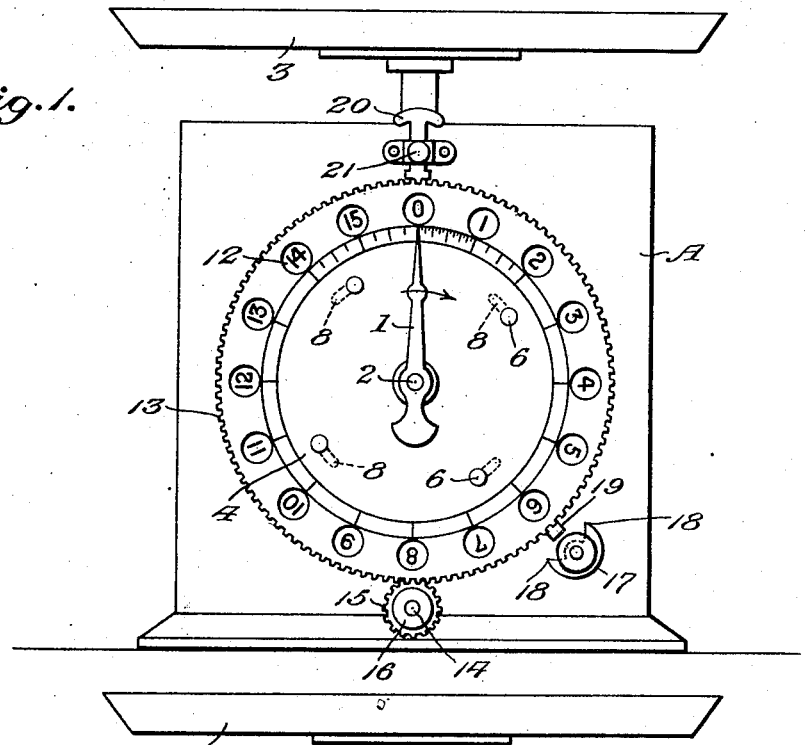

A represents a scale of any desirable type and 1 is a pointer or hand secured on the scale arbor 2 in the customary manner. Any form of pan 3 may be mounted at the top to receive the articles or material to be weighed.

The dial is composed of two disks 4 and 5 held together adjustably by rivets 6 extending through holes 7 in the outer disk 4 and through the arc-shaped slots 8 in the disk 5.

As a convenient means of construction the outer disk 4 of the dial has a flanged orifice 9 at the center which receives and is rotatably mounted upon the fixed collar 10 as shown in Fig. 3, the arbor, fixed collar and flanged orifice all being concentric.

The inner disk 5 of the dial is provided with two sets of figures at its periphery, as shown in Figure 5, for example, from zero to 15, one set extending around the disk clock-wise and the other set extending counter clock-wise, in the alternate spaces.

The outer disk 4 of the dial is provided with orifices 12, preferably round in shape and corresponding in number and spacing with the numbers in either one of the sets of figures on the periphery of the inner disk 5 shown in Fig. 5, it being understood, however, that this is merely illustrative, and that it does not in any wise limit me.

The extreme outer periphery of the outer disk 4 is provided with rack teeth 13 and a hand operating device 14 is rotatably mounted at some convenient point preferably below the dial and is provided with a pinion 15 the teeth of which mesh with the teeth 13 on the periphery of the outer disk and a knurled head 16 is provided on the outer end of the hand operating device in position to be turned when the dial is to be adjusted as will be explained in the operation of weighing.

Figure 2:
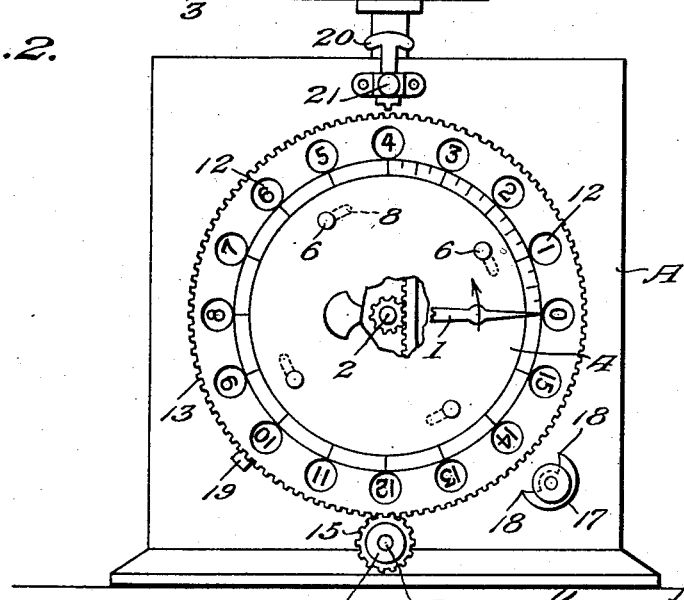
Fig. 2 is a similar view showing the opposite adjustment of the disks of the dial for weighing off.

When it is desirable to shift the disks of the dial with respect to each other, that is to say, from one extreme as shown in Fig. 1 for ordinary weighing, or weighing on, to the other extreme as shown in Fig. 2 for weighing off, shifting lever 17 is turned until one of its ends 18 engages the lug 19 on the periphery of the inner disk 5. By turning the shifting lever 17 to the left when the parts are in the position shown in Fig. 1, the inner disk 5 is moved to the right thus bringing the reverse set of figures on the inner disk 5 into registry with the orifices 12 as shown in Fig. 2. To restore the parts to normal the shifting lever 17 is turned in the opposite direction. A spring (not shown) throws it back to the position shown in Figs. 1 and 2 with the points 18 out of the path of the lug 19.

In order to prevent excessive wear from vibrations or a possibility of drawing off from zero position while moving the scale from place to place and also while operating the shifting lever 17, a locking device such as 20 is employed, it being placed slidably in position to engage the peripheral teeth 13 of the outer disk 4. It is held in either extreme position by a screw 21 as shown in Figs. 1, 2, and 3.

The following will give a general idea of the operation of the weighing mechanism: If the scale is set for weighing on and the hand indicates a weight of three pounds, and it is the desire to weigh still another or several additional objects while the first is still on the scale, the combined dials are revolved by the action of the adjusting device upon the peripheral teeth on the disk 4 until the zero figure is in exact alignment with the hand or pointer. The next object is then placed upon the scale and the weight noted by the movement of the indicator hand. This method is continued to the capacity of the scale as desired. Another example: In weighing on, if it desired to eliminate the tare of any container in which a net weight is desired to be shown, the container is placed on a scale, and, assume, it weighs two pounds. The dial is then revolved until the zero figure is again in exact alignment with the hand thus eliminating the two pound weight of the container and the article to be weighed can then be placed in the container and its weight determined. This method can be continued to the capacity of the scale. As a further example, assume that this scale is being used to weigh cartons that are being filled with five pounds of dried beans in each. In each case the tare of the carton is taken care of by the adjusting device. But owing to the nature of the contents the indicator hands shows either a slight or undetermined over or under weight at the filling. This error which is not constant in every filling operation is difficult to rectify in present weighing methods. Such errors can be easily compensated for by the adjusting device by bringing desired point on the dial in exact alignment with the indicator hand.

It is understood that the number of holes and weight indicating numbers, and in fact many of the other features described and shown are merely illustrative, but not intended to limit me, as it is my intention to provide scales with an unlimited weighing capacity, carrying out and in extension of this general idea, and to do which it would only be necessary to increase the capacity of the dials in order to accomplish that end.

I claim:

1. A weighing mechanism including a resettable dial having a plurality of sets of indications thereon progressively in opposite directions.

2. A weighing mechanism including a resettable dial having a plurality of sets of indications therearound progressively in opposite directions.

3. A weighing mechanism including a resettable dial having a plurality of sets of weighing indications therearound progressively in opposite directions, and means for causing the use of only a portion of the sets of indications at a time.

4. A weighing mechanism including a resettable dial having a plurality of sets of weighing indications therearound progressively in opposite directions, means for adjusting said dial to bring only a portion of the sets of indications into use at a time, and means for concealing the remaining indications.

5. A weighing mechanism including a resettable dial having two sets of numerals arranged progressively therearound in opposite directions, and means for causing the use of only one set of indications at a time.

6. A weighing mechanism including a resettable dial having a plurality of sets of weighing indications arranged progressively therearound in opposite directions, and means for covering a portion of the sets of indications during the use of the remainder.

7. A weighing mechanism including a resettable dial composed of two disks adjustably connected together, one of said disks having a plurality of sets of indications arranged thereon progressively in opposite directions, and the other disk having orifices therein in position to register with only a portion of the sets of indications at a time.

8. A weighing mechanism including a resettable dial composed of back and front disks adjustably connected together, the back one of said disks having a plurality of sets of weighing indications arranged therearound progressively in opposite directions, and the front disk having orifices therethrough in position to register with and make visible only a portion of the sets of indications at a single weighing operation.

9. A weighing mechanism including scales, a pointer, a resettable dial having numerals arranged clockwise and counter clock-wise thereon, said dial being adjustable for weighing on or weighing off, and means for causing the use of only one set of numerals at a time.

10. A weighing mechanism including scales adapted for weighing on or weighing off, a dial having sets of numerals arranged progressively in opposite directions thereon, and means for covering one set to present the other set in position for use causing either a weighing on or a weighing off action at a time.

11. A weighing mechanism including scales, a pointer, and a resettable dial having numerals arranged clockwise and counter clock-wise thereon, said dial being adjustable for weighing on or weighing off.

12. A weighing mechanism including a hand of pointer movable about a center with the weighing mechanism, a dial composed of two disks pivotally connected together, one disk having two sets of figures arranged in reverse of each other around the periphery and the other disk provided with orifices a distance apart to correspond with that of the numbers of one set of the figures on the other disk, one of the disks having peripheral teeth and a hand operating device having teeth intermeshed with the peripheral teeth of the dial for resetting the dial.

13. A weighing mechanism including a hand or pointer movable about a center with the weighing mechanism, a dial composed of two disks pivotally connected together, one disk having two sets of figures arranged in reverse of each other around the periphery and the other disk provided with orifices, a distance apart to correspond with that of the numbers of one set of the figures on the other disk, one of the disks having peripheral teeth, a hand operating device having teeth intermeshed with the peripheral teeth of the dial for resetting the dial and a shifting lever connected with the weighing mechanism for adjusting the disks of the dial to one extreme position or the other.

14. A weighing mechanism including a pointer, a resettable dial having peripheral teeth, means in position to engage the teeth for resetting the dial, and means slidable into and out of engagement with the teeth for locking the dial in its set position.

In testimony whereof I affix my signature.

GEORGE L. ZUCKER.